Dec. 1, 1970  E. WEICHEL  3,543,498

CROP CARRYING VEHICLE HAVING PLURAL CROP RECEIVING DEVICES

Filed Oct. 6, 1969

INVENTOR

ERNST WEICHEL

United States Patent Office 3,543,498
Patented Dec. 1, 1970

3,543,498
CROP CARRYING VEHICLE HAVING PLURAL CROP RECEIVING DEVICES
Ernst Weichel, 1, Bahnhofstrasse, 7326 Heiningen, Kreis, Goppingen, Germany
Continuation-in-part of application Ser. No. 672,487, Oct. 3, 1967. This application Oct. 6, 1969, Ser. No. 864,028
Claims priority, application Germany, Oct. 4, 1966, W 42,517
Int. Cl. A01d 87/00
U.S. Cl. 56—364
6 Claims

ABSTRACT OF THE DISCLOSURE

A crop carrying vehicle has a load receiving surface, a loading duct discharging onto the surface and having a width coextensive therewith, a crop receiving device arranged in front of the loading duct and discharging thereinto and conveying means operable in the loading duct to move harvested material along the duct to the load receiving surface. A pair of additional crop receiving devices are mounted on the vehicle and positioned laterally outside the vehicle profile, and each additional crop receiving device discharges harvested material onto a respective transverse conveyor device which discharges into the loading duct. The additional crop receiving devices, with their associated transverse conveyors, are mounted for pivoting, about horizontal and longitudinally extending axis, into retracted positions in which they extend vertically of the crop carrying vehicle.

CROSS REFERENCE TO RELATED APPLICATION

This application is a continuation-in-part of application Ser. No. 672,487, filed Oct. 3, 1967, for "Loading Car with Takeup Member Operating Outside the Vehicle Track."

BACKGROUND OF THE INVENTION

There are known crop carrying vehicles which are provided with a receiving drum arranged in front of a conveyor or loading duct extending substantially across the entire width of a load receiving surface, and having conveying means, such as conveyor arms, operating in the loading duct. Crop carrying vehicles of this type have been known for a long time and serve, particularly, to receive cereals and leafy vegetables, since they pick up the material to be loaded from the ground, or harvested from the crop, and convey it, without any further ground contact, to the load receiving surface or compartment of the vehicle.

By virtue of the interaction of the receiving drum with the conveyor arms extending into the loading duct, in connection with a scraper bottom acting in the load carrying compartment, it is possible to load the harvested material with a more or less high pressure corresponding to its nature. Thus it is possible, for example, in the case of dried feed, such as hay, to press the loading compartment full with harvested material, while, for delicate material, a very gentle treatment of the harvested material is possible.

In order to be able to load the harvested material economically with presently known crop carrying vehicles, it is necessary, in most cases, to divide the harvested material into single or multiple swathes, so that the conveyor element of the vehicle can be charged with a sufficient amount of material. Apart from the fact that the formation of the swathes requires an additional operation, it is usually unavoidable, with present arrangements, that tractor wheels will frequently run over the harvested material spread on the ground. This can lead to considerable losses, particularly in quality feed plants.

SUMMARY OF THE INVENTION

This invention relates to harvesting apparatus and, more particularly, to a novel crop carrying vehicle having a wide working range for receiving harvested material without the necessity of the harvested material being arranged in swathes.

In accordance with the invention, a crop carrying vehicle of the type mentioned above, and having a substantially centrally aligned loading duct discharging onto a load receiving surface, is provided with at least one additional crop receiving device positioned laterally outside the vehicle and which charges harvested material into the loading duct through a known type of transverse conveyor device.

It is possible to arrange the additional crop receiving devices on both sides of the vehicle, so that a triple loading vehicle is formed which receives harvested material to the right and to the left of the vehicle as well as directly in front of the vehicle. The receiving devices arranged to the right and the left of the vehicle charge the loading duct with harvested material which is in addition to the harvested material charged into the loading duct by the receiving device or drum positioned in front of the crop carrying vehicle. Preferably, a lateral opening is provided in the loading duct at the discharge end of each transverse conveyor device, and this lateral opening or inlet can be closed by a plate, flap, or the like. With such an arrangement, it is possible to work with only one receiving device arranged in front of the crop carrying vehicle and charging the loading duct, and with the two laterally positioned receiving devices being swung up into a rest position.

The receiving devices arranged laterally of the crop carrying vehicle can be pivotally mounted, together with the associated transverse conveyor devices, about horizontal axes so that the can be folded into a vertical position which is, at the same time, the rest position.

An object of the invention is to provide a crop carrying vehicle having a greatly increased range of operation.

Another object of the invention is to provide such a crop carrying vehicle provided, in addition to a centrally located crop receiving device, with at least one crop receiving device positioned laterally of the vehicle and swingable between a working and a rest position.

A further object of the invention is to provide such a crop carrying vehicle with a pair of additional crop receiving devices positioned laterally to either side of the vehicle and feeding harvested material into the same loading duct associated with the centrally positioned crop receiving device.

For an understanding of the principles of the invention, reference is made to the following description of a typical embodiment thereof as illustrated in the accompanying drawings.

DESCRIPTION OF THE PREFERRED EMBODIMENT

Figure 1:
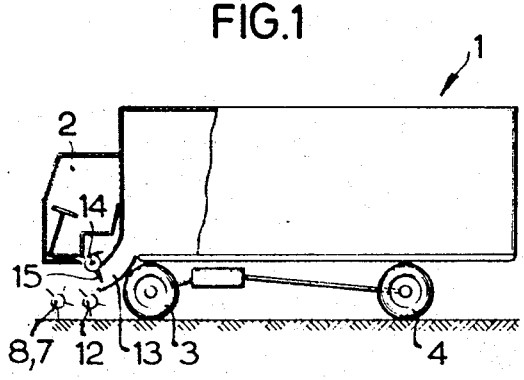
FIG. 1. is a somewhat schematic side elevation view of a self-propelled crop carrying vehicle embodying the invention.
Figure 3:
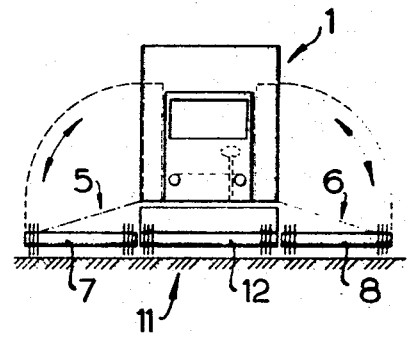
FIG. 3 is a front elevation view of the crop carrying vehicle.
Figure 2:
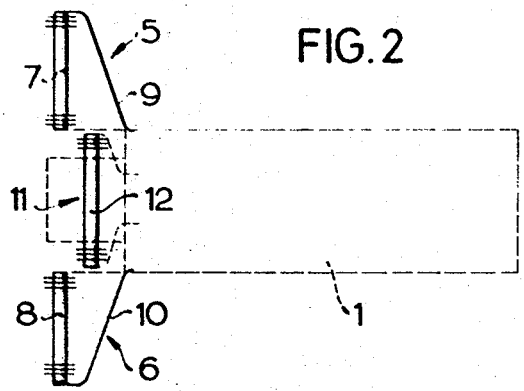
FIG. 2 is a somewhat schematic top plan view of the crop carrying vehicle shown in FIG. 1.

Referring to FIGS. 1, 2 and 3, a crop carrying vehicle is illustrated at 1 as a self-propelled or automotive vehicle. Vehicle 1 has a driver's cabin 2 at its front end, and has a pair of front wheels 3 and a pair of rear wheels 4, vehicle 1 preferably being a four-wheel drive vehicle.

To the right and to the left of vehicle 1 there are arranged receiving devices 5 and 6, each consisting substantially of the respective receiving drum 7 or 8 and an associated respective transverse conveyer device 9 or 10. A central loading device is arranged at the front end of vehicle 1, and likewise consists of a receiving drum 12 charging harvested material into a loading duct 13. Movement of the material along loading duct 13 is effected by a conveyer device 14 having conveyer arms 15 extending into loading duct 13.

Figure 4:
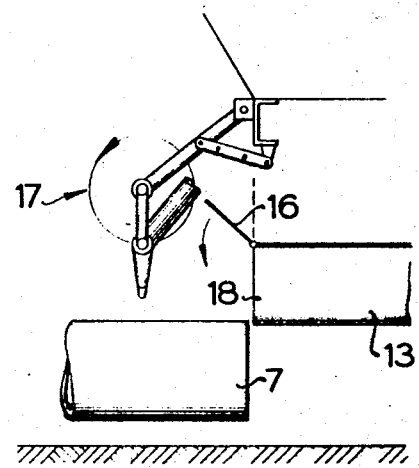
FIG. 4 is a partial elevation view illustrating a lateral inlet of the loading duct and an associated closing flap.

From FIG. 4, it may be noted that loading duct 13 has, on each of its opposite sides, an opening 18 which can be closed by a flap 16. Through openings 18, conveyer or loading duct 13 is charged with harvested material by the transverse conveyer devices 9 and 10 each arranged behind a respective crop receiving drum 7 or 8. The material charged through openings 18 is in addition to the material charged into loading duct 13 by crop receiving drum 12. An additional compression device, indicated at 17, is provided to charge harvested material through lateral opening 18 in loading duct 13, a device 17 being provided for each transverse conveyer device 9 and 10.

As best seen in FIG. 3, the lateral loading devices 5 and 6 can be turned about horizontal axes on vehicle 1, so that they can be folded into a vertical position in which they can be so locked that they do not protrude substantially beyond the profile of vehicle 1. Thereby, a simple and safe driving of vehicle 1 on a highway is assured.

The device shown in FIGS. 1–4 operates in the following manner. Each loading device 5 and 6 is provided with a respective transverse conveyer device 9 and 10, and devices 9 and 10 convey in opposed directions relative to each other. These devices thus bring in harvested material from both sides into a loading duct 13, in addition to the harvested material received from central loading device 11. This latter harvested material is conveyed in loading duct 13 by the powerful conveyer device 14 which moves the harvested material into the loading chamber of vehicle 1, wherein the harvested material is also compressed in a known manner.

It may be advisable, under certain circumstances, to arrange cutting devices at the transition point between transverse conveyer devices 9 and 10 and loading duct 13.

Naturally, the invention is not limited to the illustrated embodiment, and modifications are possible without departing from the spirit of the invention. Thus, for example, it is possible to provide milling devices instead of the receiving drums 12, these milling devices being operable to cut harvested material, in a known manner, from the crop and deliver it to the transverse conveyers 9 and 10.

While a specific embodiment of the invention has been shown and described in detail to illustrate the application of the principles of the invention, it will be understood that the invention may be embodied otherwise without departing from such principles.

What is claimed is:

1. In a crop carrying vehicle having a load receiving surface, a loading duct extending longitudinally of the vehicle and discharging onto the load receiving surface, and having a width coextensive with that of the load receiving surface, a crop receiving device arranged in front of the loading duct and discharging thereinto, and conveying means operable in the loading duct to move harvested material along the duct into the load receiving surface: the improvement comprising, in combination, at least one additional crop receiving device mounted on said vehicle and positioned laterally outside the vehicle profile; and a transverse conveyer device receiving harvested material from said additional crop receiving device and discharging it into said loading duct.

2. In a crop carrying vehicle, the improvement claimed in claim 1, including two said additional crop receiving devices each mounted on the respective side of the vehicle and positioned laterally outside the vehicle profile.

3. In a crop carrying vehicle, the improvement claimed in claim 2, including means pivotally mounting said additional crop receiving devices, together with their respective transverse conveyer devices, on said vehicle for pivoting about horizontal axes whereby said additional crop receiving devices and the associated transverse conveyer devices can be folded into a vertical retracted position.

4. In a crop carrying vehicle, the improvement claimed in claim 1, in which said loading duct is formed with a lateral inlet adjacent the discharge end of each transverse conveyer device; and means selectively operable to close each lateral inlet.

5. In a crop carrying vehicle, the improvement claimed in claim 4, including a respective compression device adjacent each lateral inlet and operable to press harvested material through the associated lateral inlet.

6. In a crop carrying vehicle, the improvement claimed in claim 1, in which each crop receiving device is a crop receiving drum.

References Cited

UNITED STATES PATENTS

| 2,343,583 | 3/1944 | Rogers | 56—345 |
| 3,367,094 | 2/1968 | Harwig | 56—364 |

FOREIGN PATENTS

| 1,071,658 | 6/1967 | Great Britain. |
| 6509734 | 2/1966 | Netherlands. |
| 447,698 | 3/1968 | Switzerland. |

LOUIS G. MANCENE, Primary Examiner

J. N. ESKOVITZ, Assistant Examiner